United States Patent [19]

Savelli

[11] Patent Number: 4,587,451
[45] Date of Patent: May 6, 1986

[54] ROTOR FOR A SMALL ELECTRIC MOTOR HAVING REDUCED SHAFT PORTION TO IMPROVE WINDINGS

[75] Inventor: Francis Savelli, Champigny, France

[73] Assignee: Ducellier & Cie, Creteil, France

[21] Appl. No.: 624,742

[22] Filed: Jun. 26, 1984

[30] Foreign Application Priority Data

Jul. 21, 1983 [FR] France .................. 83 12054

[51] Int. Cl.⁴ .............................. H02K 3/04
[52] U.S. Cl. ..................... 310/208; 310/42
[58] Field of Search .......... 29/596, 597; 310/42, 310/216, 217, 218, 261, 208, 202, 203

[56] References Cited

U.S. PATENT DOCUMENTS 2,550,663  5/1951  Bechberger et al. ............ 310/208
4,399,380  8/1983  Hirano ............................. 310/83
4,484,094  11/1984 Ade et al. ........................ 310/216

Primary Examiner—Patrick R. Salce
Assistant Examiner—D. L. Rebsch
Attorney, Agent, or Firm—Holman & Stern

[57] ABSTRACT

A rotor for a small electric motor, useful for example in a vehicle window raising device, has an armature carried by a shaft and having slots in which electrical conductors are wound and connected to a current collector. The shaft has grooves at both ends of the armature to a depth such as to permit the path of the electrical conductors passing between non-consecutive generally opposed slots during winding of the conductors at the bottom of the armature slots to be substantially rectilinear.

4 Claims, 2 Drawing Figures

ROTOR FOR A SMALL ELECTRIC MOTOR HAVING REDUCED SHAFT PORTION TO IMPROVE WINDINGS

BACKGROUND OF THE INVENTION

1. Field of the Invention

The invention relates to a rotor for a small electric motor, in particular for a back-geared motor for automotive use, such as a window raising device of the type comprising, on a shaft, an armature, a current collector and an endless screw produced integrally with the shaft.

2. Description of the Prior Art

For such rotors it is necessary to use shafts having a sufficient diameter to be able to produce the endless screw in one piece and to provide the shaft with a good degree of linearity while the back-geared motor is operating. When winding the armature, the path of the turns of the armature winding at the bottom of the armature slots, when passing from one slot to another, follows the outside of the shaft, the diameter of which is greater than that which would allow a line connecting the base of two slots receiving the same turn of the winding to be straight as a result of which the spatial requirement of the winding on both sides of the armature increases more rapidly than the slots are filled, this filling then being limited, as is the efficiency of the back-geared motor, for a given amount of space.

BRIEF SUMMARY OF THE INVENTION

The object of the present invention is to overcome these disadvantages and to this end relates to a rotor for a small electric motor, in particular for a back-geared motor for automotive use, such as a window raising device, of the type comprising, on a shaft, an armature composed of a stack of metal sheets with slots in which electrical conductors are wound, a current collector and, produced integrally with the shaft, an endless screw, the shaft being provided with grooves at both sides of the armature to a depth such as to permit the path of the electrical conductors to pass between non-consecutive generally opposed slots, during winding of the turns at the bottoms of the armature slots, to be substantially rectilinear.

BRIEF DESCRIPTION OF THE DRAWINGS

The invention will now be described in greater detail with reference to the accompanying drawings wherein.

DETAILED DESCRIPTION

Figure 1:
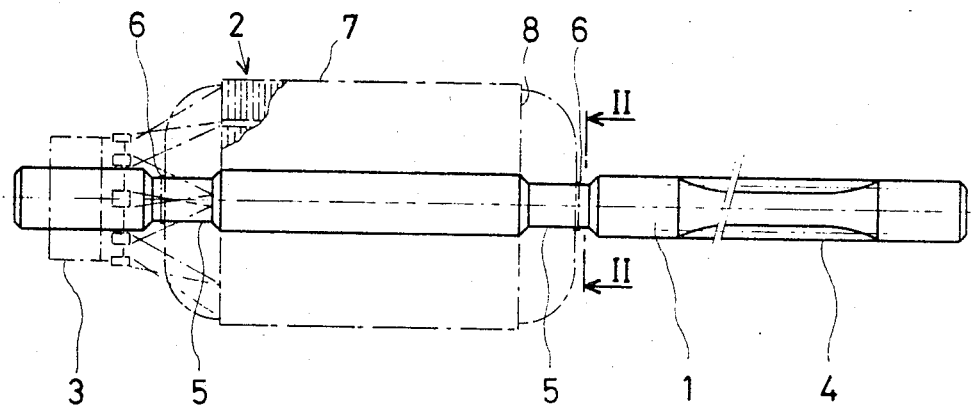
FIG. 1 is an elevational view, partly in phantom and broken away for clarity of a rotor according to the invention.

The rotor is formed in known manner by a shaft 1 which has an armature 2 formed by a stack of metal sheets 7 with slots 8 and 9 in which windings are produced whose ends are connected to a collector 3 supported by the shaft 1, the rotor also including an endless screw 4 produced in one piece.

Figure 2:
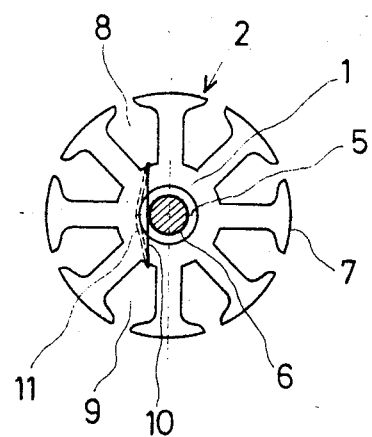
FIG. 2 is a cross-sectional view taken along line II—II of FIG. 1, omitting certain parts for clarity.

As the windings have been produced by the passage of the conductor wire from a slot 8 to a slot 9, as shown in FIG. 2 in broken lines, the path of the winding turns at the bases of the slots during the said passage, form a curve 11 tangential to the outside of the shaft 1, the diameter of the latter being chosen so that it is sufficiently large not only to allow the endless screw 4 to be produced in one piece, but also to provide the shaft 1 with a good bending strength, with the result that the spatial requirement of the windings on both sides of the stack of metal sheets 7 quickly becomes considerable and does not allow the slots 8 and 9 to be filled correctly.

In the rotor of the invention, grooves 5 are provided in the shaft 1 on both sides of the stack 7, the depth of three grooves 5 being defined such that the path 10 of the windings at the bases of the slots, e.g. from the slot 8 to the slot 9, is rectilinear, which makes it possible to obtain an additional amount of space corresponding to the difference between the respective diameters of the shaft and the groove, and consequently to increase the number of turns in the slots without increasing the spatial requirement for passing from one slot to another. The entire armature is then impregnated by an insulator 6 of the epoxy resin type.

Such a rotor therefore makes it possible to produce a more effective motor without changing its spatial requirement.

I claim:

1. In a rotor for a small electric motor, particularly of the type suitable for automotive use such as in a window operating device, comprising:

a rotor shaft and an armature including a stack of metal sheets mounted on said rotor shaft to rotate therewith, said armature having slots in which electrical conductors are wound; and a groove disposed in said rotor shaft at each end of said rotor shaft adjacent said armature, each said groove having a depth sufficient to allow said electrical conductors passing across the respective said end of said armature between non-adjacent substantially opposed slots to be substantially rectilinear where said electrical conductors are disposed adjacent said rotor shaft;

said rotor shaft having a predetermined diameter on which said armature is mounted, for supporting said armature; said predetermined diameter being greater than a diameter of said rotor shaft at the location of each said groove.

2. A rotor as claimed in claim 1 wherein each said groove is a reduced diameter circumferential groove disposed in said shaft; and at least a portion of some of said electrical conductors are disposed substantially tangentially to a peripheral surface of each respective groove.

3. A rotor as claimed in claim 1 wherein said rotor shaft further comprises a worm gear integrally formed on a portion of said rotor shaft at a location which is axially spaced from one of said grooves; and a current collector mounted on said rotor shaft operatively connected to ends of said electrical conductors.

4. A rotor as claimed in claim 2 wherein said rotor shaft further comprises a worm gear integrally formed on a portion of said rotor shaft at a location which is axially spaced from one of said grooves; and a current collector mounted on said rotor shaft operatively connected to ends of said electrical conductors.

* * * * *